United States Patent

[11] 3,629,083

[72] Inventor: Marcel Brendle, Wittenheim, France
[21] Appl. No.: 756,571
[22] Filed: Aug. 30, 1968
[45] Patented: Dec. 21, 1971
[73] Assignee: Centre National De La Recherche Scientifique, Paris, France
[32] Priorities: Aug. 31, 1967
[33] France
[31] 119564;
June 11, 1968, France, No. 154610

[54] PROCESS OF POLYMERIZATION IN AN ELECTRIC FIELD AND NEW PRODUCTS OBTAINED THEREBY
10 Claims, 16 Drawing Figs.

[52] U.S. Cl. .................................................. 204/165, 204/312
[51] Int. Cl. .................................................. B01k 1/00
[50] Field of Search .................................... 204/165, 312, 166, 167, 168

[56] References Cited
UNITED STATES PATENTS

| | | | |
|---|---|---|---|
| 2,726,204 | 12/1955 | Park et al. | 204/72 |
| 2,849,356 | 8/1958 | Manion | 204/312 X |
| 3,321,391 | 5/1967 | Warfield et al. | 204/165 |
| 3,421,930 | 1/1969 | Knox et al. | 204/165 X |

Primary Examiner—John H. Mack
Assistant Examiner—Neil A. Kaplan
Attorney—William D. Stokes ABSTRACT: Organic compounds are polymerized by establishing an electric field within the monomer between electrodes the surfaces of which are composed of substances which can form $\pi$-complexes with the organic compounds. Such substances include metals, notably alkali and alkaline earth metals, iron, copper, titanium or brass, or oxides such as copper oxide. Metals employed as electrode surfaces are preferably of imperfect crystalline structure, being for example, amalgamated. Polymers produced from benzene, toluene, tetrahydrofuran, styrene and pyridine are described, as well as their infra-red spectra.

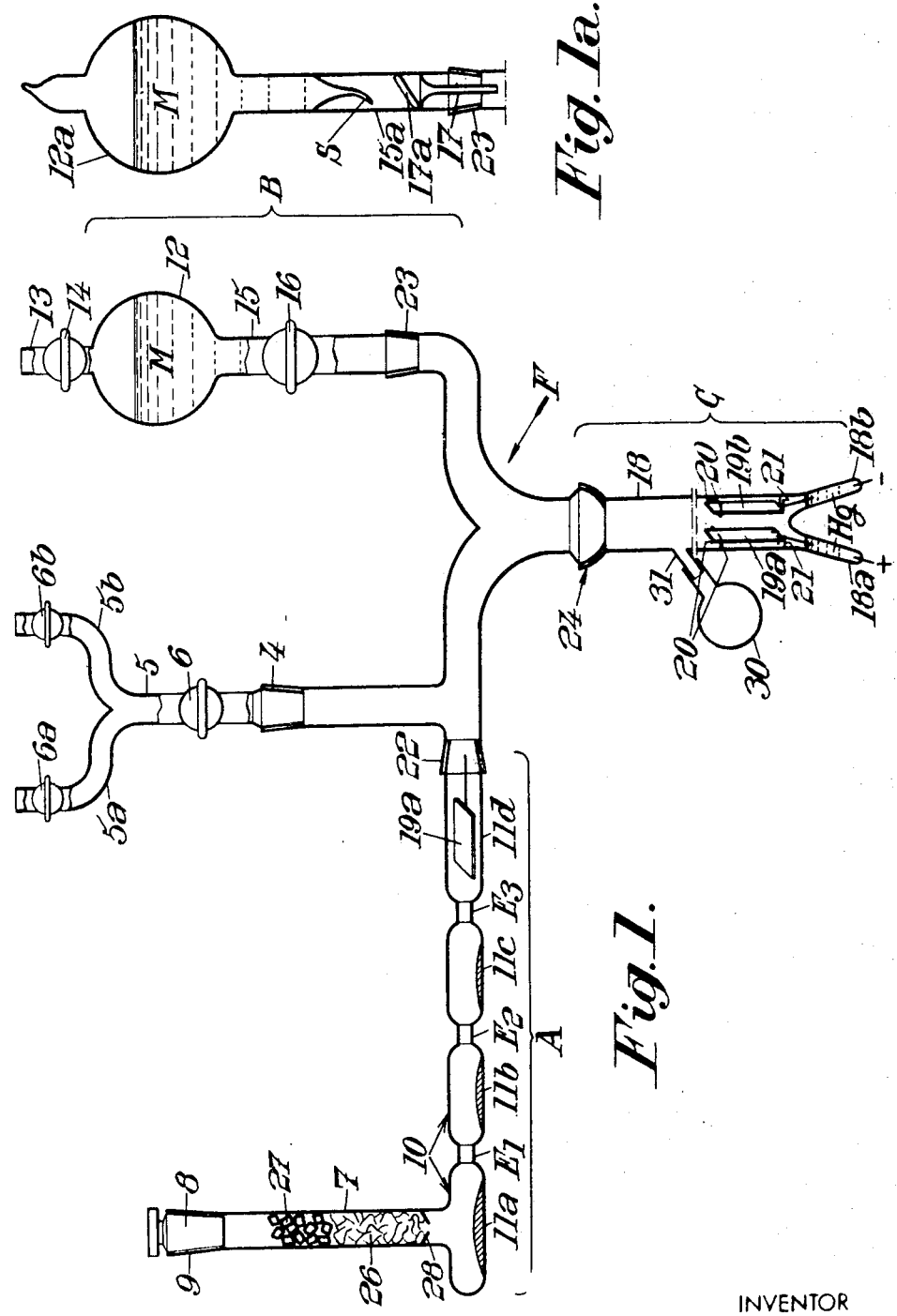

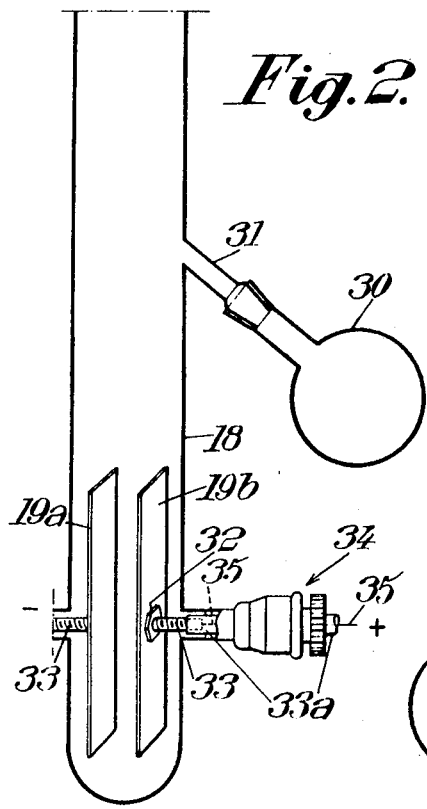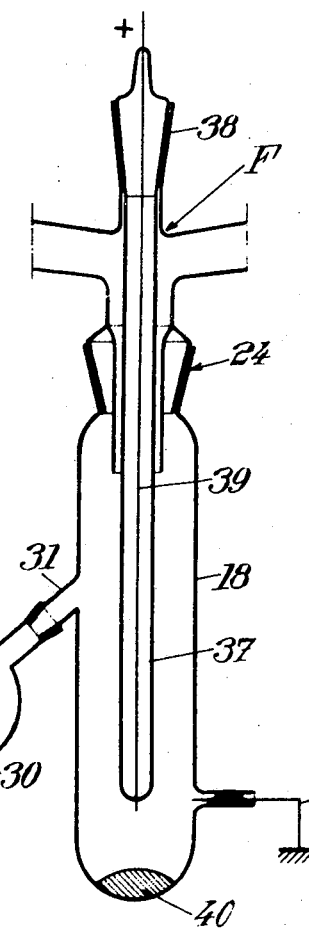

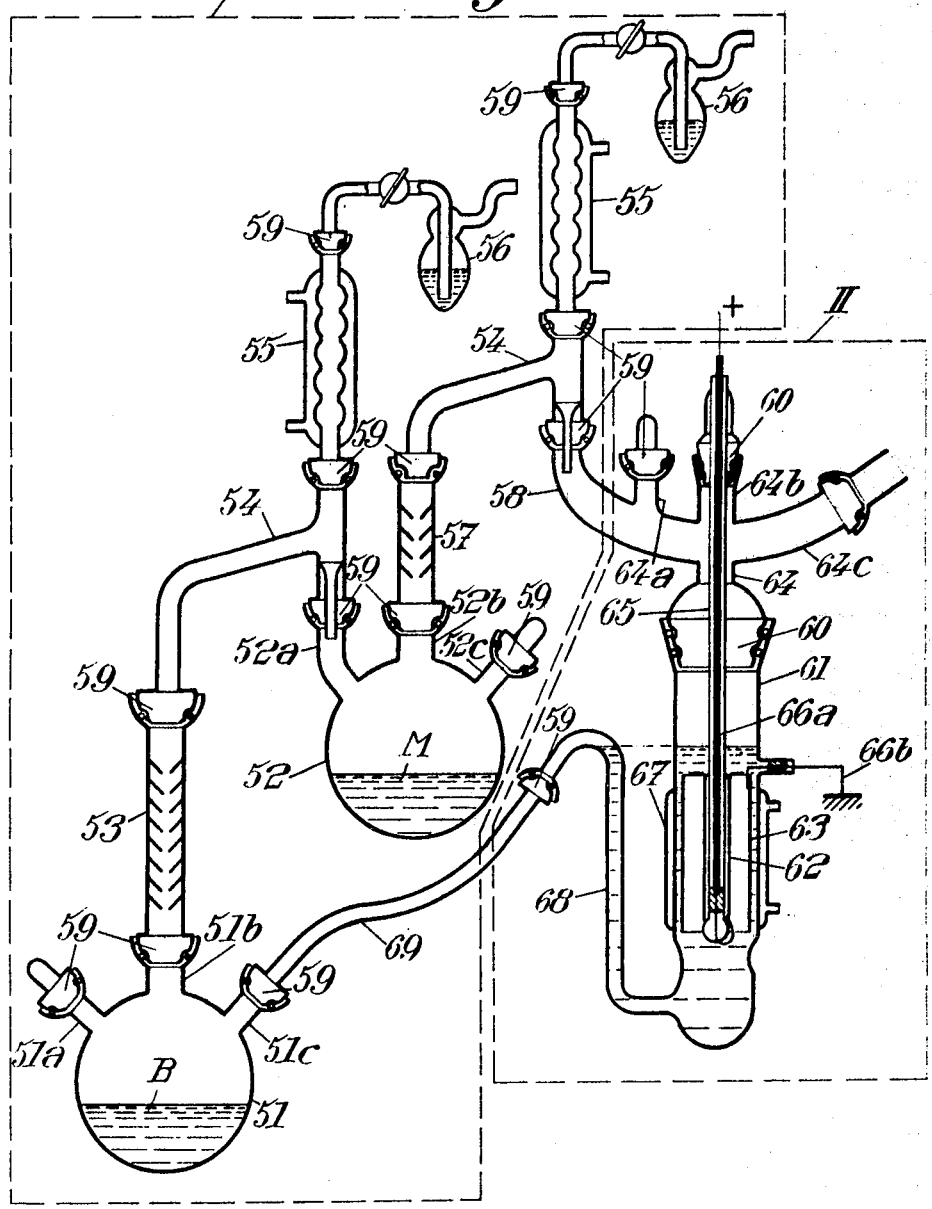

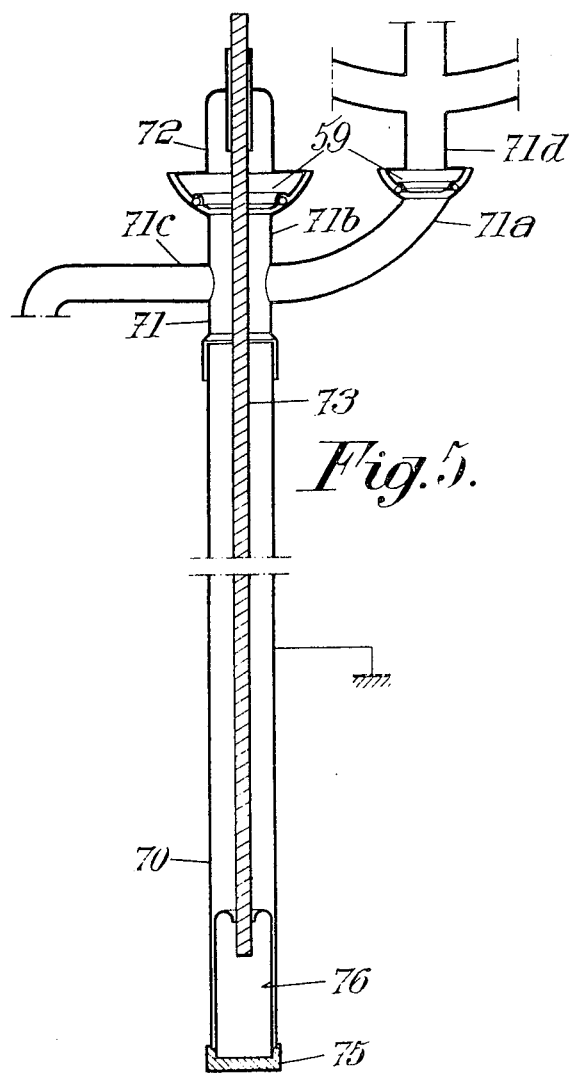

INVENTOR
MARCEL BRENDLE

INVENTOR
MARCEL BRENDLE

PROCESS OF POLYMERIZATION IN AN ELECTRIC FIELD AND NEW PRODUCTS OBTAINED THEREBY

The invention relates to a process of polymerization in an electric field. It also relates to certain new polymers obtained in this way.

The process according to the invention is characterized by the fact that an electric field is set within a monomer with the aid of electrodes immersed in the said monomer, the surface of the electrodes being constituted by a substance capable of forming π complexes with ethylene compounds or aromatic compounds and which is insoluble in the monomers or solvents used and does not possess any labile groups likely to inhibit an ionic polymerization reaction.

This substance must be such that it can itself form an electrode or can attach itself securely to a conductive support.

First of all, it will be recalled that a substance capable of forming π complexes is a substance which can combine strongly with molecules containing either ethylene or aromatic linkages, or undivided doublets, that is to say molecules possessing π electrons.

Substances capable of forming π complexes include in particular, the metals and also certain oxides.

Among the metals which have enabled good results to be obtained there are strongly electropositive metals, more particularly, alkali metals and alkaline earth metals, and also other metals, among which there may be mentioned nickel, copper, titanium and iron, as well as certain alloys such as brass.

The formation of the π complexes is greatly assisted when finely divided metals or metals having, generally speaking, a very imperfect crystalline structure as used. The yield is better, even in the case of the alkali metals, when the surface of these metals is slightly amalgamated and thereby possesses a less perfect structure. The yields are then multiplied by a not insignificant factor.

In order to obtain the aforesaid finely divided metallic structures, it is possible to resort to cathodic atomization of the metals under vacuum, reduction of an oxide in situ or thermal decomposition of the metal carbonyls, in particular in the case of nickel.

In the case of alkali metals such as potassium and sodium, it is advantageous, in order to form the electrodes, to cover metallic supports with these very electropositive metals, the covering being effected in an inert atmosphere and being followed by direct conveyance into the polymerization cell, without there being any contact with the surrounding air.

In order to prepare electrodes of slightly amalgamated copper, it is possible to resort to treatment of the said electrodes with an acid solution of mercury salts.

Copper oxide may be mentioned as an example of an oxide which has enabled satisfactory tests to be carried out.

To prepare electrodes clad with copper oxide, a plane copper electrode can be attacked by wetting it with a concentrated solution of $HNO_3$, evaporating the solution of nitrate obtained in this way and then decomposing the nitrate by heating in a flame to obtained a plate coated with black oxide.

It is also possible to deposit a film of oxide by cathodic atomization under partial pressure of oxygen.

In order to operate under the best possible conditions, there are employed electrodes having a perfectly clean surface and monomeric reactants which have been carefully purified and rid of traces of moisture, and of products containing labile hydrogen.

Due to the process according to the invention, it is possible to operate in the absence of a polymerization initiator.

In fact, the initiation is then obtained by means of electrons and/or ions which are extracted from the electrodes within the very reaction medium under the effect of the electric field.

In the case of the metals, it is observed that in general the application of an electrostatic field generally ranging between 5,000 and 500,000 v./cm., and varying with the metals and the nature of their surface and with the monomer, enables polymerization to be initiated.

The invention will be clearly understood with the aid of the additional description and the examples which follow and of the accompanying drawings.

FIG. 1 of these drawings shows in diagrammatic section an apparatus suitable for carrying the process according to the invention into effect;

FIGS. 1a, 2 and 3 show modified forms of parts of the apparatus shown in FIG. 1;

FIG. 4 shows diagrammatically another apparatus suitable for carrying the process according to the invention into effect;

FIG. 5 shows diagrammatically, on a larger scale, a component part of the apparatus of FIG. 4 which is constructed in a modified form;

Figure 6:
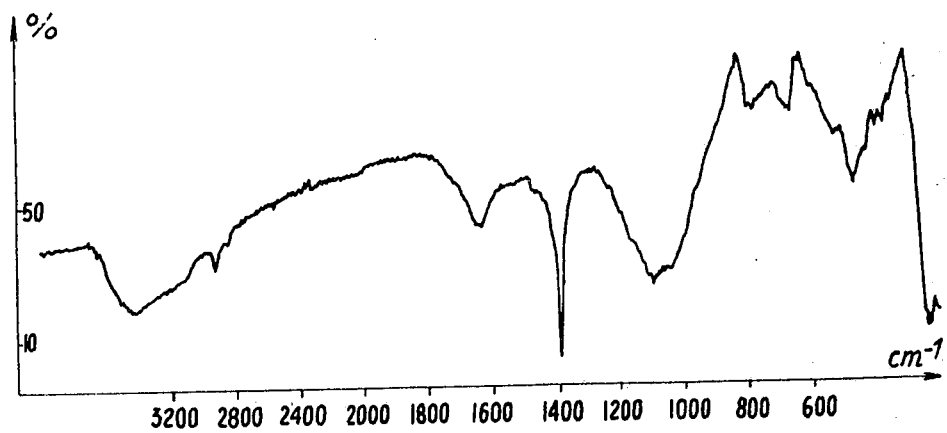

Finally, FIGS. 6–15 are records of I.R. spectre of polymers obtained by the use of the process according to the invention.

First of all, there will be described hereinafter with reference to FIG. 1 an apparatus when enables the electrodes to be coated with sodium or potassium and to be brought into the polymerization cell, all these operations being effected in an inert atmosphere or under vacuum.

This apparatus comprises essentially three parts which can be interconnected, namely:

a part A in which the coating of the electrodes with the layer of sodium or potassium is carried out, a part B reserved for supplying monomer;

a part C reserved for the polymerization reaction proper.

The interior of the apparatus can be connected by means of a conical ground joint 4 to a tubing system 5 which comprises a tap 6 with two tubes 5a and 5b which include taps 6a and 6b, respectively, and which are respectively in communication with a source of vacuum and a source of inert gas, for example, nitrogen.

First of all, as regards the part A, this comprises a substantially vertical tube 7 closed by a ground glass stopper 8 cooperating with a ground joint 9 and communicating at its lower end with a substantially horizontal tube 10 divided by constructions $E_1$, $E_2$, ... into successive compartments 11a, 11b, ....

The part B comprises essentially a flask 12 which, on the one hand, can be supplied with monomer and placed under vacuum by means of a tube 13 equipped with a tap 14 and which, on the other hand, can be emptied of its contents through a tube 15 equipped with a tap 16.

Finally, the part C comprises the reaction chamber in which the polymerization takes place and which may be in the form of a vertical tube 18 of a large section, against the inner face of which two electrodes 19a and 19b can be retained so as to face each other, for example, with the aid, respectively, of two horizontal hooks 20 and two vertical hooks 21. At the lower end of the tube 18 there may be provided, as shown, two separate compartments 18a and 18b filled with mercury. Respective conducting wires belonging to the two electrodes dip into the mercury in each of these compartments, the said compartments being moreover respectively connected to the positive and negative poles of a source of electric current.

The surface of the electrodes cam thus comprise amalgamated sodium or potassium, which is advantageous as hereinbefore indicated.

The parts A, B and C are connected to the three branches of an intermediate element F by means of two conical ground joints 22 and 23, as regards the parts A and B, and by a spherical ground joint 24, as regards the part C.

It will be clearly understood that the nature of the grease lubricating the various ground joints and taps which may be brought into contact with the monomer must be chosen so that it cannot effect the polymerization reaction unfavorably. Certain greases containing silicones have given satisfactory results.

It is preferable, however, to arrange the apparatus in such manner that contact between the monomer and the aforesaid greases is avoided. To do this, the taps 14 and 16 are eliminated, the flask 12 being replaced by a sealed flask 12a which is welded to a tube 15a which can be fitted in the ground joint 23. An internal tube 17 avoids contact of the monomer with the grease at the ground joint 23. To introduce the monomer into the part C, the lower end S is broken by means of a magnet 17a. This arrangement is completed by replacing the joint 24 by a greaseless joint, for example, of the type of those sold under the mark "ROTULEX" (FIG. 1a).

In order to carry the process into effect, after bleeding the apparatus which has just been described and filling it with nitrogen, a few pieces of sodium or potassium 27 are placed in the vertical tube 7 on a plug of cotton wool 26, the plug 26 itself being held in place, for example, by spikes 28 mounted on the inner face of the tube.

By then heating the tube 7, the sodium is melted and it is sufficient to establish a negative pressure below the plug 26 by placing the tube 5 in communication with the source of vacuum to cause the molten sodium to pass through the plug of cotton wool, leaving all impurities behind therein, and accumulate in the compartment 11a. This sodium is then distilled under vacuum towards the compartments 11b and 11c in succession and, finally, a last distillation is carried out so as to deposit a layer of sodium on the inner face of the compartment 11d. By means of a magnet, each of the electrodes is then brought in succession into the compartment 11d (to do this, the electrodes are therefore made of magnetic material) and this compartment is heated sufficiently to cause a coating of sodium to be deposited on the electrodes. Still with the aid of the magnet, the electrode concerned is then brought into the part C and is placed behind the hooks 20 and 21.

The same procedure is adopted for the second electrode.

This having been done, the part A is detached under a stream of nitrogen, the ground joint 22 is plugged and the cock 16 is then opened to introduce into the part C the monomer contained in the flask 12 and designated by the reference M.

It is then sufficient to establish the electric field for the reaction to start.

It is advantageous to provide on the vertical tube 18 an overflow device which may be formed by a flask 30 fixed in liquidtight fashion to a neck 31 on the said vertical tube.

By way of modification (see FIG. 2), it is pointed out that the holding in place of the electrodes 19a and 19b may also be achieved by furnishing one of the faces of the said electrodes with a nut 32 into which there is screwed a bolt 33 carried by a glass tube 33a placed in position in a greaseless seal (for example, an assembly 34 of the type of those sold under the mark "TORION") which is fitted to the tube 18. The tube 33a extends through the assembly 34 in tight fashion, as shown. Through the tube 33a itself there extends in tight fashion a platinum wire 35 soldered to the bolt 33 and which can be connected to one of the poles of a source of high-voltage electricity. To effect the screwing of the bolt 33 into the electrode, the latter is shifted by means of a magnet so that the bolt 33 can be engaged in the nut 32.

This arrangement is advantageous because of the possibility which it offers of varying the distance separating the electrodes by acting on the location of the tube 33a in the seal 34.

Here again, an overflow device similar to that of the apparatus of FIG. 1 and indicated by the same reference numerals is provided.

According to a second modified constructional form, which is illustrated more particularly in FIG. 3, one of the electrodes is formed by the inner face of the tube 18 (and is connected to earth, for example, by means of a conductor 36, as shown) and the other by the outer face of a tube 37 introduced through a conical ground opening 38 provided in the three-branched part F, as shown, and into which there is inserted the end of the said tube, this end forming a stopper and being also conical and of complementary form.

A wire 39 conducting electricity extends through the tube 37 and one end thereof extends into the tube 18 and the other extends to the outside to be connected to the positive pole of a source of electricity.

In order to coat the two electrodes defined in this way with a layer of sodium with a clean surface, a quantity of sodium 40 can be arranged at the bottom of the tube 18 and heated to cause distillation thereof and deposition on the two electrodes.

This last modified constructional form seems to be most easily applicable on an industrial scale.

The apparatus which will be described with reference to FIG. 4 has given satisfactory results and enables the drying of the monomers to be polymerized to be carried out side by side with the polymerization reaction.

This apparatus comprises a first assembly designated by the reference I and intended more particularly for the purification of the monomer and a second assembly designated by the reference II and constituted essentially by the polymerization cell.

As regards the assembly I, this is composed of two flasks 51 and 52 having three necks 51a, 51b and 51c and 52a, 52b and 52c, respectively. The flask 51 is surmounted by a Vigreux column 53 or the like, which is connected to the neck 52a of the flask 52 through the medium of a first three-branched connection 54, the form of which can be seen from the drawing; the connection 54 carries a reflux condenser 55 which can be connected to atmosphere through a mercury trap 56. The neck 52b is surmounted by a Vigreux column 57 or the like, which is connected to a second three-branched connection 54 to a neck 58 of the assembly II, to which reference will be made. The second three-branched connection 54 also carries a reflux condenser 55 which can be connected to atmosphere through a mercury trap 56.

In order to avoid contaminating the monomers and the products obtained with grease, recourse is had, for forming the joints between the aforesaid elements (flasks, Vigreux columns, connections, condensers, mercury traps) and between the elements making up the assembly II to which reference will be made, to spherical joints 59 (for example those known under the mark ROTULEX) or to conical joints 60 (for example those under the marks WESTESS or TORION).

Now, as regards the assembly II which forms the polymerization cell, this comprises a cylindrical tube 61 inside which there are disposed two concentric electrodes 62 and 63 connected to a source of high voltage and to earth, respectively; the tube 61 is surmounted by a connection 64 with four necks, namely the aforesaid neck 58, a neck 64a, a neck 64b disposed along the extension of the axis of the tube 61, and a neck 64c which can be connected to a vacuum pump or to a source of inert gas.

A glass tube 65 is introduced into the tube 61 through the neck 64b, the said glass tube carrying the electrode 62 in the vicinity of its lower end and having extending through it a conducting wire 66a one end of which is connected to a source of high voltage and the other end of which is connected to the electrode 62.

Around the electrode 62 is supported the electrode 63, which is connected to earth by a conducting wire 66b, as shown in FIG. 1.

So as to be able to adjust the temperature prevailing inside the cell, this is equipped with a cooling jacket 67.

Finally, an overflow device 68 connects the tube 61 to the flask 51 by means of a connection 69.

The apparatus formed in this way operates in the following manner.

After complete degassing of the apparatus and in a nitrogen atmosphere, pure monomer B is introduced into the flask 51 and monomer M (with the addition of butyllithium or another soluble ionic reagent capable of reacting with the possible impurities) is introduced into the flask 52. The contents of the flasks 51 and 52 are then brought to boiling point, for example, by employing heating cups. A purified product is then distilled from the flask 52 and, after condensation, reaches the tube 61, in which it cannot exceed the level determined by the location of the overflow 68, which is so chosen that the electrodes are immersed. The electric field between the electrodes 62 and 63 is established from the moment when the circulation of the monomer has reached its standing rate. At this moment, the polymer which is formed in solution inside the tube 61 is gradually carried into the flask 51, where it concentrates as the test proceeds. The traces of water which may be present on the walls of the apparatus are gradually consumed inside the flask 52 by reaction with the butyllithium.

In order to increase the amounts of polymer obtained at the end of the test, the area of the electrodes may be increased and, in particular, that of the electrode 63 which is earthed, that is the anode. To do this, it is possible to employ longer electrodes, for example as can be seen in the constructional form of FIG. 5, which the lower part of the cell is formed directly by the anode, designated by the reference 70, and the upper part by a glass element 71 having three necks, namely:

- a neck 71a which is connected by a three-necked connection 71d to the supply system of the cell, as well as to a vacuum pump and a source of inert gas,
- a neck 71b which is disposed on the axis of the anode 70 and is closed by stopper 72, through which latter extends the inner electrode designated by the reference 73 and which is connected to a source of high voltage,
- a neck 71c which forms part of an overflow device.

The joint between the anode 70 and the element 71 can be produced by means of Araldite.

As can also be seen in FIG. 5, the lower end of the anode 70 can be supported by a base 75 and a centering piece 76 for the electrode 73 can be provided inside the lower part of the said anode.

Of course, it is possible to group a plurality of polymerization cells formed in this way in series and incorporate them in an assembly as described with reference to FIG. 4.

Once the substance forming the surface of the electrode and the monomer to be polymerized have been chosen, it is a question of determining the minimum value of the voltage, or the "threshold voltage," that it is necessary to apply to the electrodes in order to extract from them within the very reaction medium, under the effect of the electric field set up, the electrons and/or ions which are necessary for initiation of the polymerization.

This threshold is characterized by a sudden change in the resistivity of the medium. When a given cell is used for the first time, it is therefore necessary to follow the variation in the intensity of the current flowing between the electrodes as a function of the voltage applied. Below the threshold, the resistance between the electrodes is controlled by the resistivity of the solvent. Above the threshold, supplementary ions are created and these considerably reduce the resistivity of the medium.

When a test is recommenced with identical conditions, it is possible, of course, to apply the threshold voltage directly.

It is obvious that if the voltage actually applied must be higher than the threshold voltage, care must be taken not to go as far as the breakdown voltage. The yield and the molecular weight of the products obtained appear to be at a maximum when a voltage is used which has a value near this threshold voltage. At higher approved values of the voltage, polymers with shorter chains, and even dimers, are obtained.

To illustrate the process according to the invention, the following tests have been carried out.

1.—POLYMERIZATION OF TOLUENE

Operation was carried out in an apparatus corresponding to that of FIG. 1, to which the modified construction of FIG. 2 was fitted.

The metal coating the electrodes was sodium and the electric field, which was applied for 2 hours, had an intensity of 20 kv./cm.

The formation of a new crystallized polymer (filaments which may attain a length of 1.5 cm. and particles which are either colorless, or red or black) directly on the anode is observed, this polymer being characterized by a melting point beginning at 232° C. (birefringent regions still substiting at 265° C.).

The I.R. spectrum of the crystallized product obtained is that shown in FIG. 6.

On pouring the residual solution into methanol, the formation of a precipitate is observed and this, on study, proves to be formed by microcrystalline particles.

Toluene was also polymerized by employing the apparatus of FIG. 3, the intensity of the electric field applied being 30 kv./cm.

Figure 7:
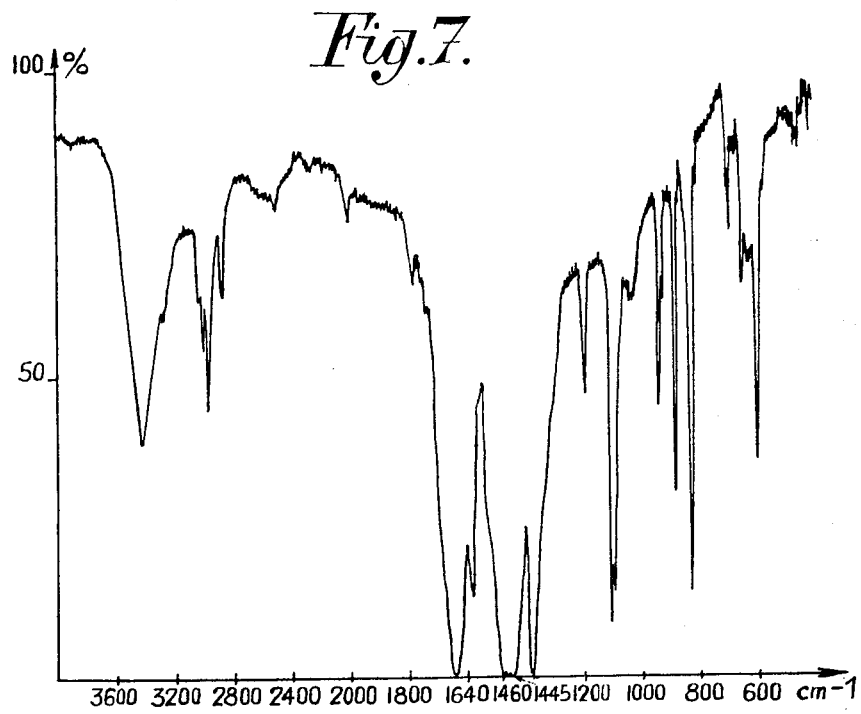

In addition to the crystallized polymeric product the spectrum of which has been referred to above, there is isolated from the solution a white powder the infrared spectrum of which is shown in FIG. 7.

Figure 8:
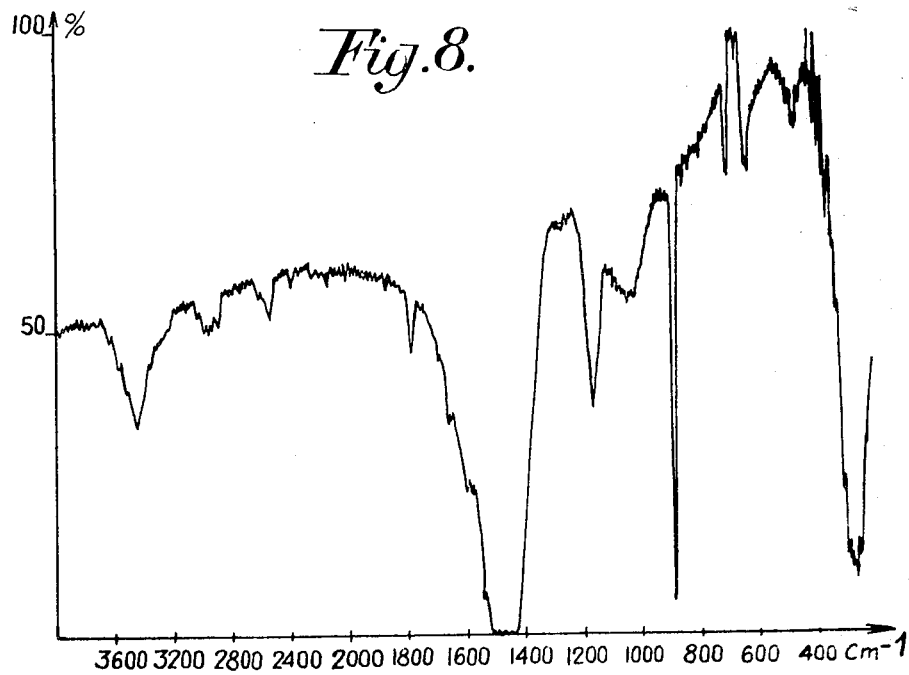

After slight heating in air (temperature 150°–200° C.), a different product, the spectrum of which is that of FIG. 8, is obtained.

This white product is a mixture of oligomers of great thermal stability; by thermal analysis, two reversible transformation points located at 470° and 580° C., respectively, are revealed.

Figure 9:
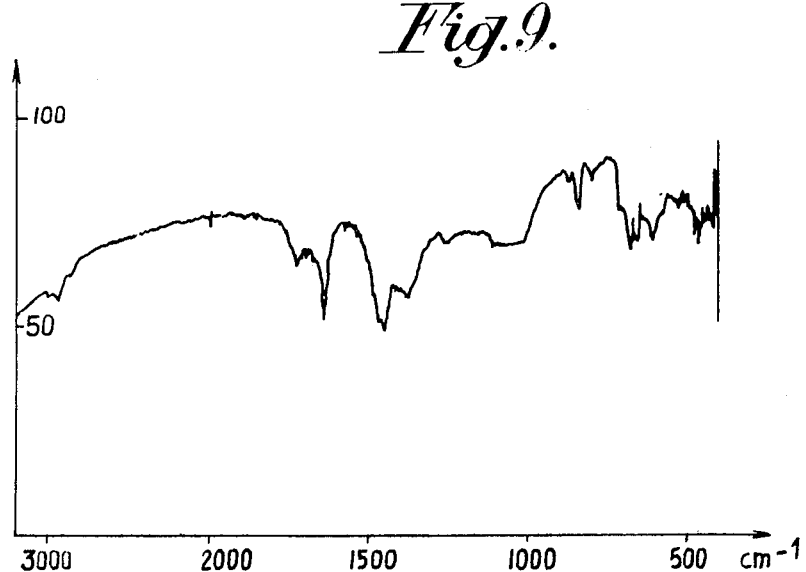

FIG. 9 shows the spectrum of a toluene polymer (copper electrodes coated with sodium; alternating field of 24 kv.). This product is in the form of a film of polymer which is collected on the electrode after immersion in methanol.

Figure 10:
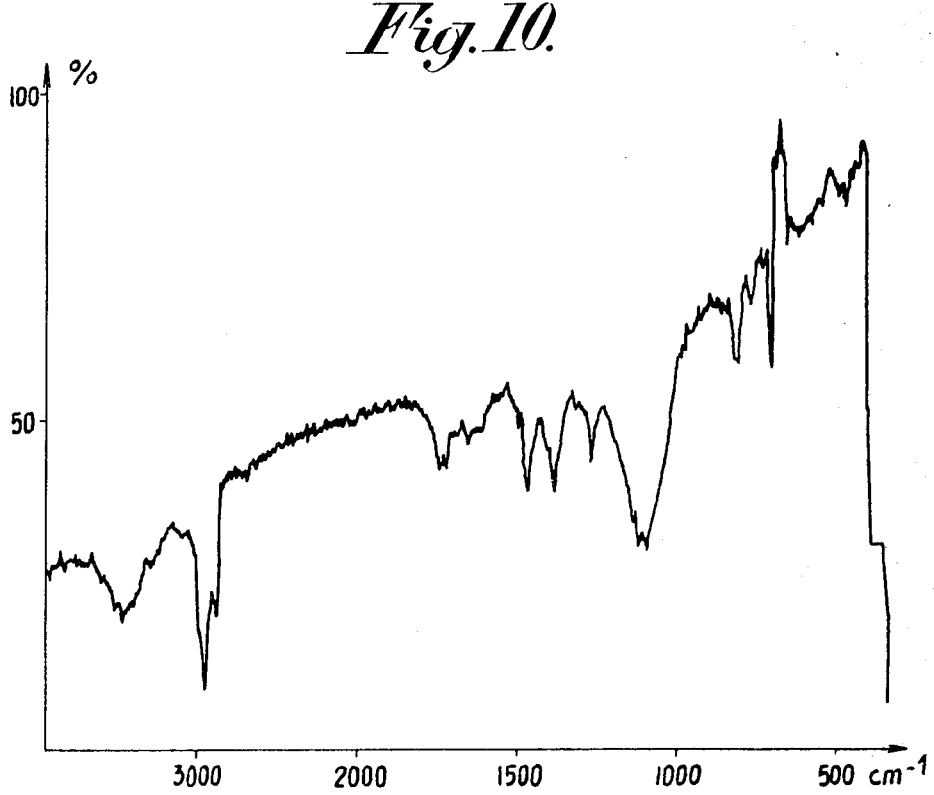

Toluene, when polymerized in a cell of the type having concentric electrodes which is described hereinbefore, gave, at 25 kv. and with copper electrodes coated with sodium, a product the infrared spectrum of which is as shown in FIG. 10.

Generally speaking, it is observed that with electrodes with a freshly worked surface, for example worked on a lathe, crystalline polymeric particles are obtained.

2—POLYMERIZATION OF TETRAHYDROFURAN

Operation was carried out in an apparatus corresponding to that of FIG. 1, to which the modified construction of FIG. 2 was fitted.

The metal coating the electrodes this time was sodium and the electric field, which was applied for 30 minutes, had an intensity of 10 kv./cm.

During the test, the formation of rapidly dissolving filaments or filiform changes of index developing perpendicularly to the anode were observed.

At the end of the test, the appearance of the liquid was not changed, but, by precipitation in water, a new, easily crystallizing filamentary polymer is isolated.

Moreover, by evaporation of the solution after filtration of the precipitate, it is possible to isolate a product of low molecular weight the I.R. spectrum of which shows essentially the presence of hydroxyl (—OH) groups and double bonds.

When the intensity of the field is increased, this latter product is formed preferentially, increases the conductivity of the medium, consequently, rapidly makes cessation of the test necessary.

3—POLYMERIZATION OF STYRENE

One hundred grams of monomeric styrene which has been completely degassed in the dry state is subjected to polymerization in the apparatus used for example 1.

The interplate volume, that is to say the useful volume, is 30 cc.

The metal coating the electrodes being sodium, the intensity of the electric field equal to 9 kv./cm. (45 $\mu$a.) and the duration of the test equal to 2 hours, the following are obtained:
- a fraction of amorphous polymer,
- a fraction of crystallized polymer forming a new product.

As regards the amorphous polymer, the polymer formed on the electrodes in the form of gel and the polymer which is formed in solution are isolated separately.

Viscosity measurements and determination of the molecular weights gave the following results:

| | Viscosity expressed in CGS units | Molecular weight |
|---|---|---|
| Polymer formed on the electrodes | 750 | 2,450,000 |
| Polymer formed in solution | 206 | 470,000 |

It is pointed out that in the absence of an electric field amorphous polymer is also produced (but not crystallized polymer), both on the electrodes and in solution. The viscosity of the polymer formed on the electrodes is 484 (in CGS units) and its molecular weight is 1,380,000, the viscosity of the polymer formed in solution is 151 and its molecular weight is 316,000.

The infrared spectrum of the amorphous polymer is that of conventional polystyrene.

As regards the crystallized polymer, this is formed solely on the electrodes. It is isolated from the amorphous polymer by dissolving the latter.

The melting point of the crystallized polymer is 246° C.

By diffraction with X-rays, an absolutely distinct powder pattern is obtained.

Figure 11:
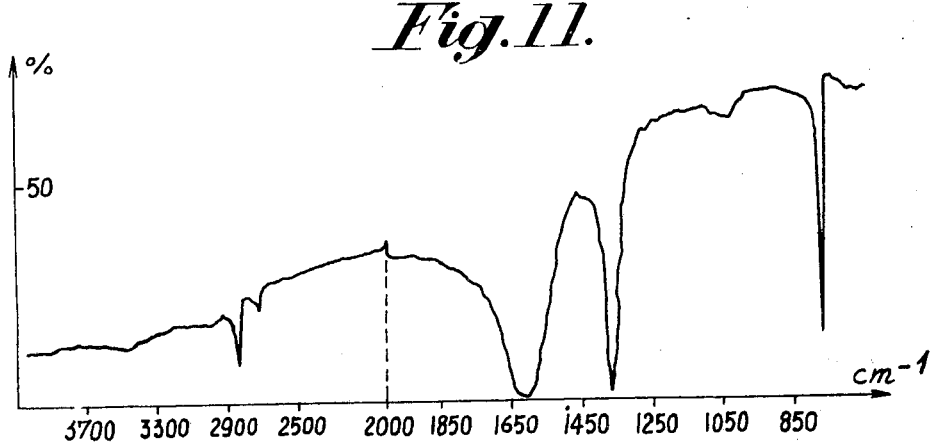

The infrared spectrum (obtained from crushed crystals in suspension in a pellet of CsBr) is as shown in FIG. 11.

4—POLYMERIZATION OF BENZENE

The apparatus shown in FIG. 4 was employed, the substance forming the surface of the electrodes being sodium and the intensity of the electric field being 50 kv./cm.

Figure 12:
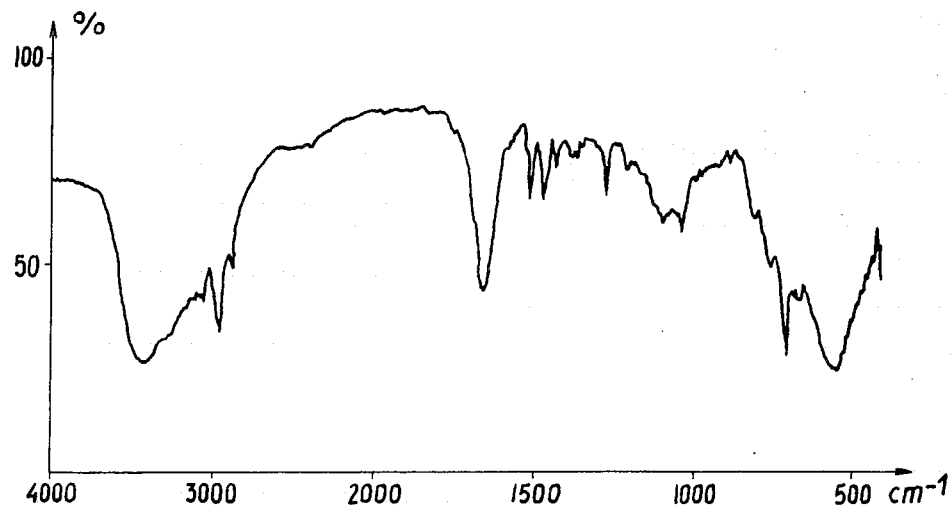

The infrared spectrum (transmission in percent as a function of the number of waves in cm.$^{-1}$) of the white polymer recovered by precipitation in a water-alcohol mixture is as shown in FIG. 12.

From the characteristics of this spectrum, it could correspond to a product the formula of which, taking account of the polymerization mechanism according to the present invention, would be:

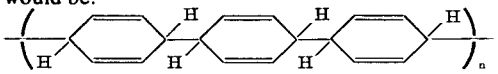

which can be rearranged as:

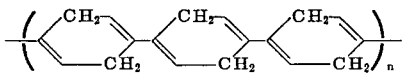

or again:

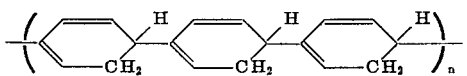

In reality, it is possible to have these structures simultaneously, which may explain the different types of aliphatic C—H bonds which are observed in the region of 2,800 to 3,000 cm.$^{-1}$ of the infrared spectrum. Also in this spectrum, the double bonds C=C are manifested by peaks at 700, and in the region of 1,500 to 1,650 cm.$^{-1}$ and the aromatic and/or ethylene C—H bonds by peaks between 3,000 and 3,100 cm.$^{-1}$.

Figure 13:
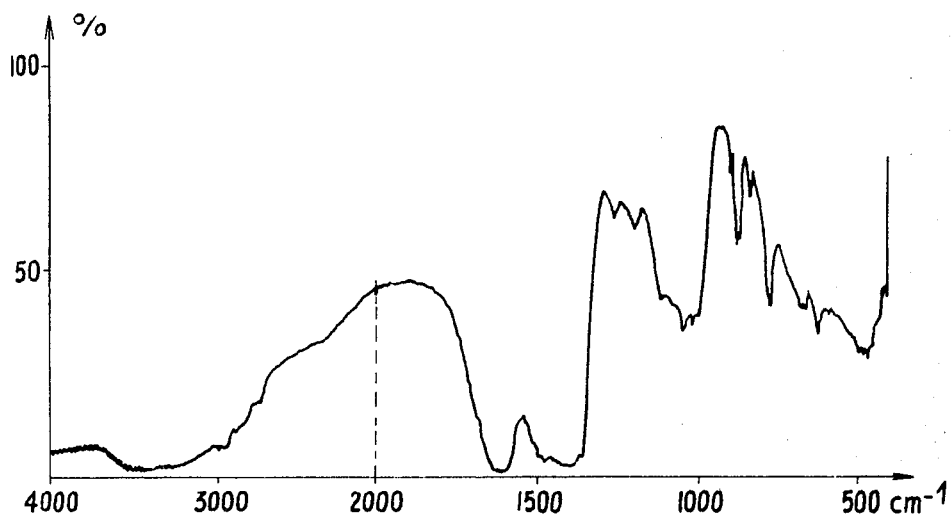

FIG. 13 shows the infrared spectrum of a product prepared from benzene on a copper electrode in the apparatus of FIG. 4, the voltage being 30 kv./cm. Study of this spectrum shows a certain relationship of the compounds obtained with those whose spectrum is shown in FIG. 12.

5—POLYMERIZATION OF PYRIDINE

The apparatus of FIG. 4 was employed with the use of electrodes whose surface was formed of alkali metals.

It was therefore necessary to cool the polymerization cell by reason of the relatively high intensity (35 mA at 5 kv./cm. which passes through the liquid.

Figure 14:
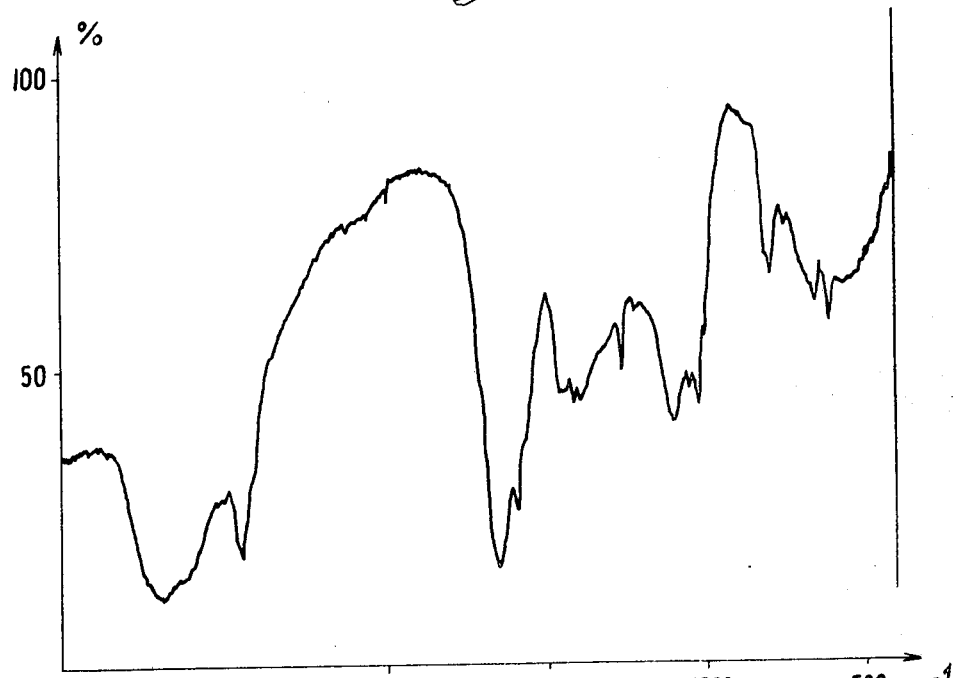

After the stopping of the reaction, the mixture of pyridine and products is poured into heptane and, after the mixture has been left for a few hours and filtered, there is obtained by evaporation and orange-yellow product the infrared spectrum of which is that of FIG. 14. This product does not cause any ash to be deposited by calcination (it is therefore not a salt) and is soluble in dimethyl sulfoxide and aqueous acid solutions.

Figure 15:
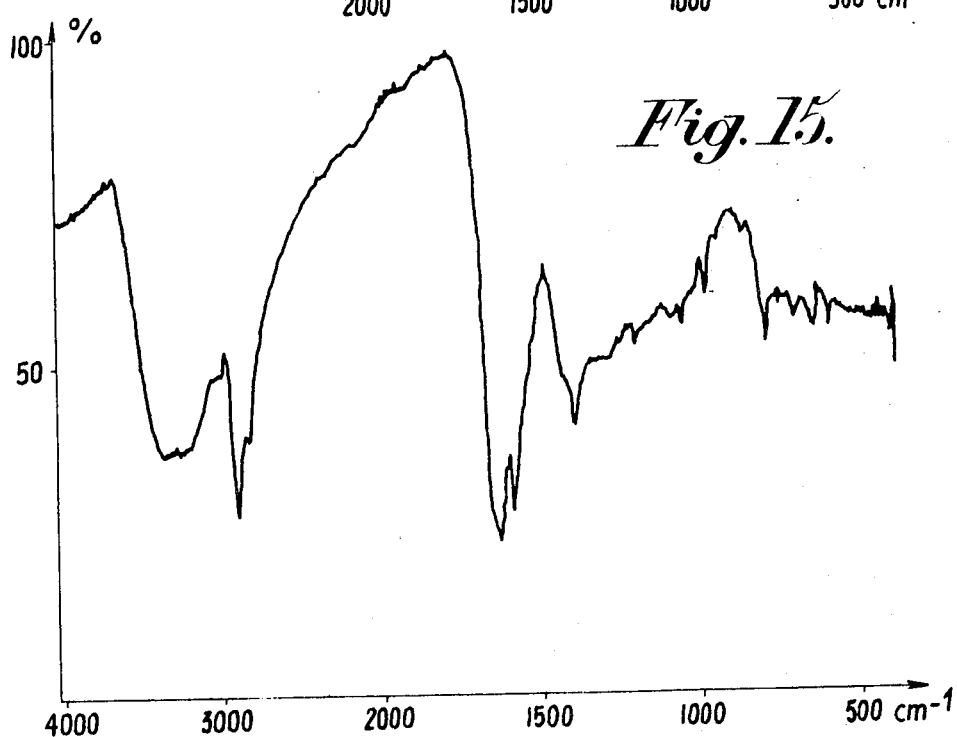

On heating, no melting point is observed, but at about 240° there is obtained a dark red solid the infrared spectrum of which is shown in FIG. 15.

The solid phase which is recovered after the aforesaid filtration is generally constituted by sodium bicarbonate (this sodium bicarbonate comes from the reaction of the atmospheric $CO_2$ with an intermediate organometallic compound), but, in some cases, there is also isolated, after extraction of the carbonate with water, a light orange-yellow product with the same infrared spectrum as the aforesaid orange-yellow product. It seems that these two products are identical, but that the second has a higher molecular weight (it is moreover almost insoluble in dimethyl sulfoxide and only soluble in aqueous acid solutions).

A particularly advantageous process is thus obtained, which is relatively cheap to put into practice and can be carried out continuously and without the introduction of external impurities into the polymerization medium, and which furthermore provides new products, notably polymers of monomers reputedly difficult to polymerize, such as benzene, or practically unpolymerizable, such as toluene.

Moreover, at least some of the polymers so obtained, such as those of benzene and of toluene, are stable to heat. This property makes it possible, especially in the case of polytoluene, to envisage their substitution for plastics materials, such as polyphenyls, which are at present used in certain advanced techniques (aviation, space vehicles) in which the thermal resistance of these materials can be severely tested. This substitution appears to be particularly advantageous when the new polymers, notably such as the polytoluene obtained, are distinctly more soluble in numerous solvents than the polyphenyls.

The process according to the invention applied to the polymerization of benzene, further provides a new way of making these polyphenyls, the conversion of the polybenzene obtained in accordance with this process into polyphenyl being capable of achievement by means of a dehydrogenation treatment or oxidation of this polybenzene.

What is claimed is:

1. Process of polymerization comprising the steps of:
  a. bringing monomer to be polymerized in a liquid state into contact with electrodes in an inert atmosphere, said monomer and said atmosphere being free of moisture, oxygen, labile hydrogen groups and polymerization catalysts, said electrodes having surfaces constituted by a substance which can form $\pi$-complexes with ethylenic or aromatic compounds, said substance being insoluble in said monomer or in solvent present with said monomer and being free of labile groups which can inhibit an ionic polymerization reaction, and
  b. establishing an electric field in said monomer between said electrodes, the intensity of said field being at least a threshold value, said threshold value being the minimum value required to extract from the electrodes immersed in the monomer the charges necessary to initiate polymerization.

2. The process of claim 1 wherein the surfaces of said electrodes are constituted by a metal.

3. The process of claim 2 wherein said metal is finely divided.

4. The process of claim 2 wherein said metal is of imperfect crystalline structure.

5. The process of claim 4 wherein the surface of said metal is amalgamated.

6. The process of claim 2 wherein said metal is selected from the group consisting of alkali and alkaline earth metals.

7. The process of claim 2 wherein said metal is selected from the group consisting of iron, titanium, copper, nickel and brass.

8. The process of claim 1 wherein the surfaces of said electrodes are constituted by an oxide.

9. The process of claim 8 wherein said oxide is copper oxide.

10. The process of claim 1 wherein the intensity of the electric field ranges between 5 and 50 kv./cm.

* * * * *